March 26, 1935.  F. WUNSCH  1,995,594
TELEMETRIC MEASURING SYSTEM
Filed Aug. 29, 1931   3 Sheets-Sheet 1
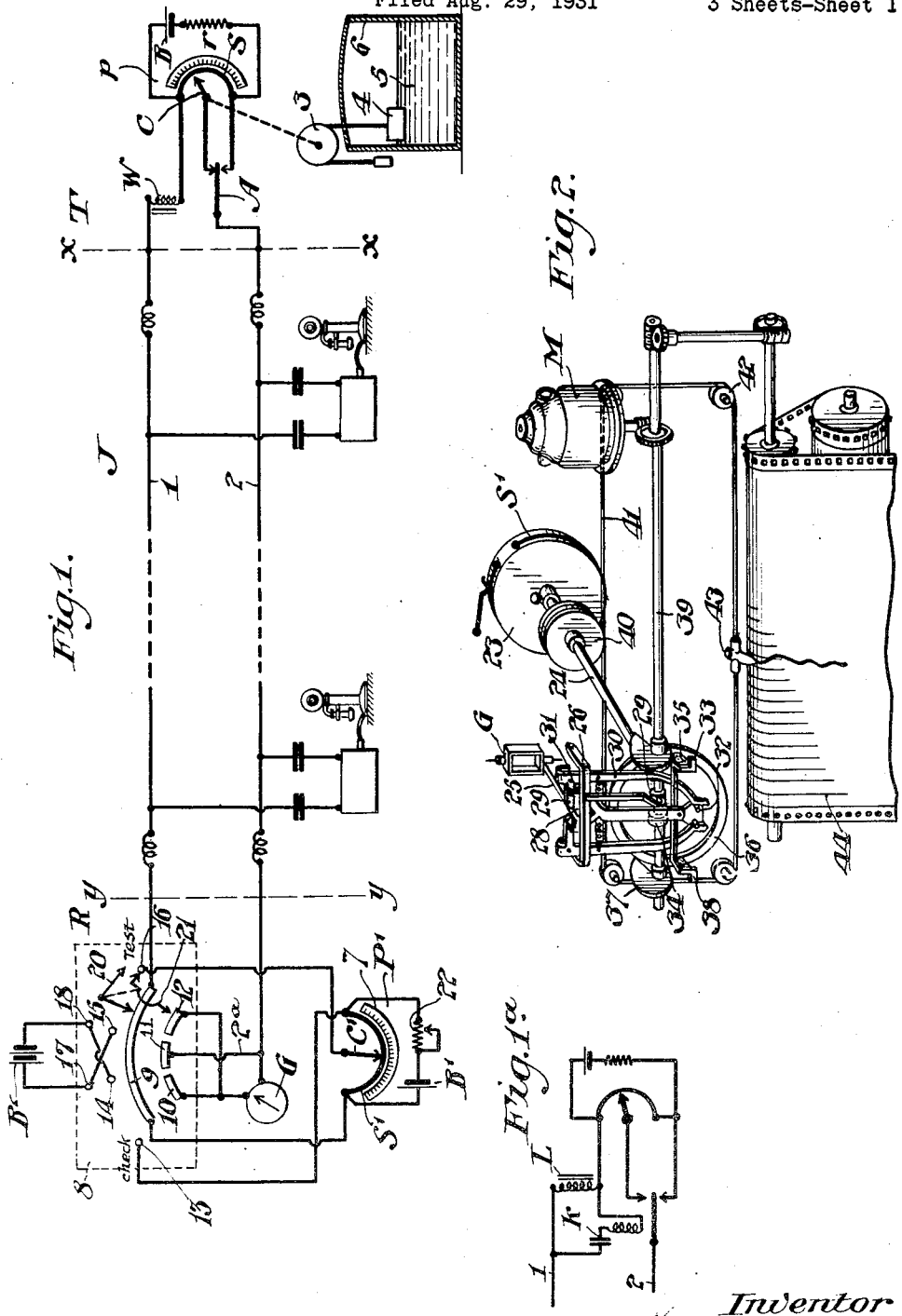

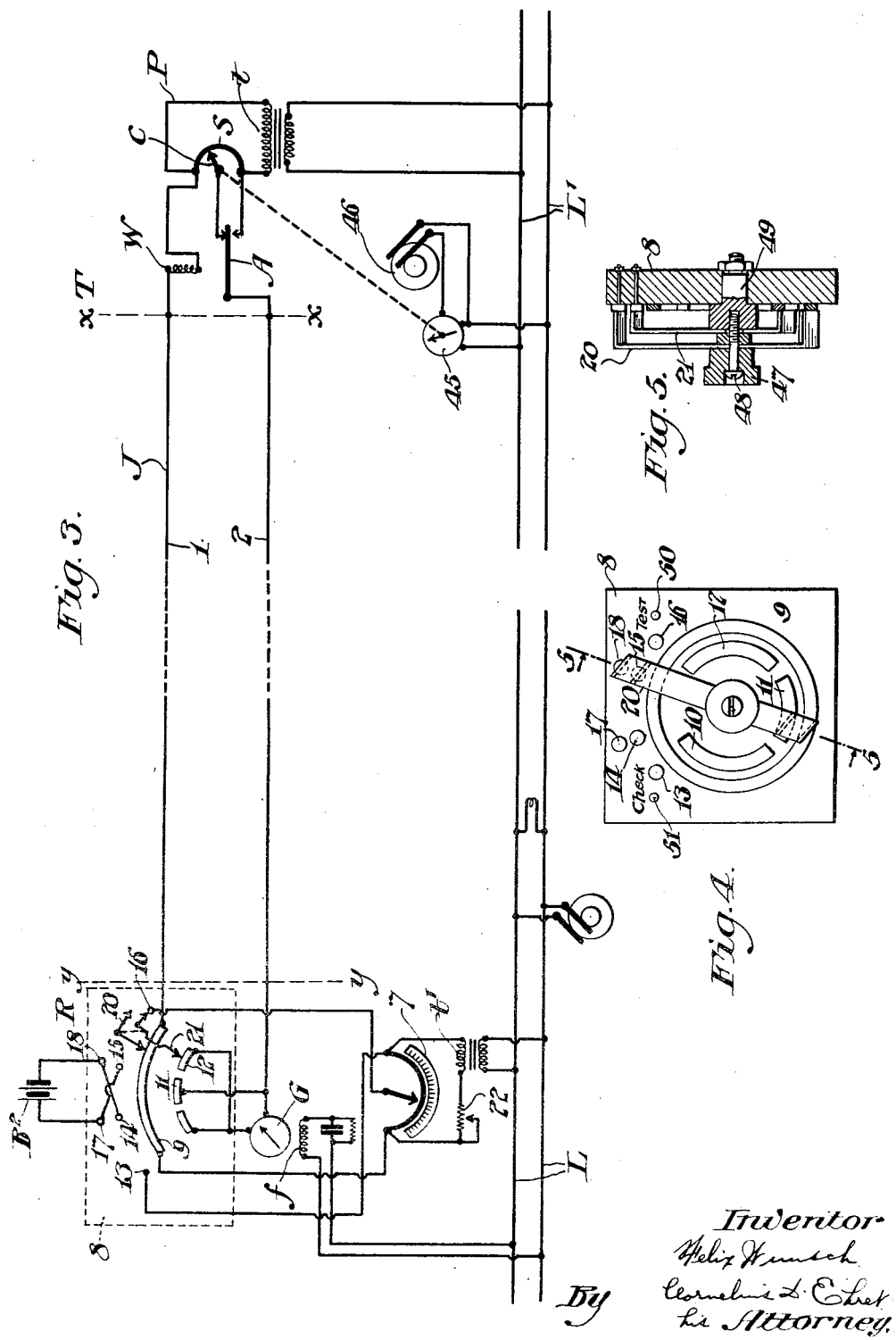

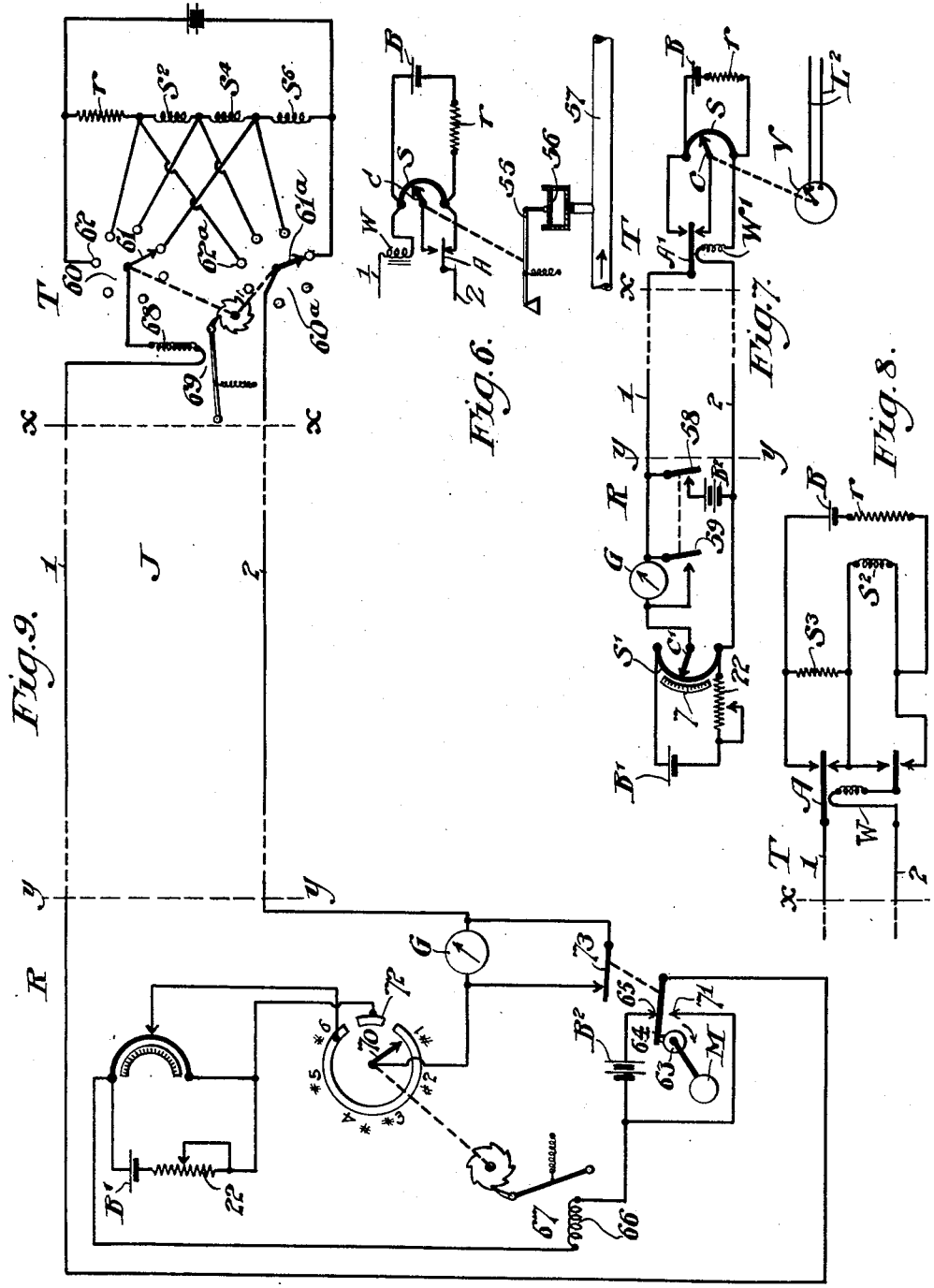

Patented Mar. 26, 1935

1,995,594

UNITED STATES PATENT OFFICE 1,995,594

TELEMETRIC MEASURING SYSTEM

Felix Wunsch, Philadelphia, Pa., assignor to Leeds & Northrup Company, Philadelphia, Pa., a corporation of Pennsylvania Application August 29, 1931, Serial No. 560,152

15 Claims. (Cl. 177—351)

My invention relates to telemetric systems and more particularly to electrical systems utilizing potentiometer networks at the receiving and sending stations.

In accordance with my invention, adjustments necessary to obtain proper correspondence between the measurements taken at the transmitting station and the indications or record made at the receiving station are effected at the latter without need for an operator or attendant at the transmitting station; more specifically, the voltage applied to the potentiometer at the receiving station is adjusted to balance the voltage applied to the potentiometer at the transmitting station, preferably by uilizing the same conductors normally linking the potentiometers for recording or indicating.

Further in accordance with my invention, the act of moving a switch from "test" to "check" position or vice versa, at the receiver suitably changes the connections of the link circuit to the receiver potentiometer, and transmits over the link circuit a current for energizing a relay correspondingly to change the link circuit connections to the transmitter potentiometer.

My invention also resides in the methods and system hereinafter described and claimed.

For an understanding of my invention and for illustration of some of the forms it may take, reference is to be had to the accompanying drawings in which:

Fig. 1 discloses diagrammatically a telemetric system for recording level of liquid.

Fig. 2 in perspective illustrates a recorder apparatus utilizable in the system of Fig. 1.

Fig. 3 diagrammatically represents a further modification of my invention.

Fig. 4 is a front elevational view of switching mechanism utilized in the systems of Figs. 1 and 3.

Fig. 5 is an end elevational view taken on line 5—5 of Fig. 4.

Figs. 6 and 7 illustrate diagrammatically further modifications of telemetric systems utilizing my invention.

Fig. 8 diagrammatically illustrates the transmitting station of a further modified form of telemetric system.

Fig. 9 illustrates diagrammatically a telemetric system for associating a single receiving station with a plurality of transmitting stations.

Referring to Fig. 1, the telemetric system consists generally of a sending or transmitting station T, to the right of dotted line $x$, a receiving station R, to the left of dotted line $y$, and a transmission system J consisting of a pair of conductors 1 and 2, such as an ordinary two-wire telephone line.

The transmitting station includes a potentiometer network P having a slide wire S whose movable contact C is adapted to be adjusted along the slide wire by an instrument measuring the magnitude of some condition; for example, in the system shown, the slide wire contact C is mechanically connected to a pulley 3 which is rotated by the float 4 as the level of liquid 5 varies in tank 6. The slide wire S is connected, preferably in series with a suitable resistance $r$, across the terminals of a current source, specifically a battery B.

Accordingly, as the level of liquid in container 6 varies, the position of the potentiometer contact C correspondingly varies along slide wire S, so that the voltage difference between the transmission conductors 1 and 2, which are normally connected respectively to the upper terminal of the slide wire and the slide wire contact, varies with the height of liquid in the container 6, which may be for example, a large storage tank for oil, or other fluid.

At the receiving station, there is a second potentiometer circuit P1, having a slide wire S1, along which is adjustable a slide wire contact C1, cooperating with a scale 7, which may be calibrated in the units of measurement, specifically in feet, for indicating the height of liquid in tank 6. The terminals of potentiometer battery B at the transmitting station, and potentiometer battery B1 at the receiving station, which are of the same polarity, are connected to opposite ends of the transmission conductor 1. At the receiving station, the transmission conductor 2 is normally connected through a galvanometer G, or equivalent, with the slide wire contact C1 of the receiving potentiometer.

To determine the height of liquid in the tank 6 which may be many miles from the receiving station, the slide wire contact C1 of the receiving potentiometer is adjusted, either manually, or automatically by mechanism hereinafter identified, until the galvanometer G shows no deflection, at which point, the difference of potential between the slide wire contact C1 and the end of the slide wire S1 connected to the transmission conductor 1 is the same as or equal to the difference in potential between the slide wire contact C of the transmitting potentiometer and the end of its slide wire connected to transmission conductor 1.

The readings obtained at the receiving end will not, however, be correct unless the potentials applied to the terminals of the slide wires at the transmitting and receiving stations are the same. The voltages of the batteries B and B1 may not decrease at the same rate with increasing age, in which event the position of the contact C1 at the receiving end will not correspond to the position of contact C at the transmitting end, but will differ therefrom in a sense which depends upon which of the two batteries is of higher voltage, and to an extent depending upon the difference between the battery voltages.

Heretofore it has been necessary for an attendant to check the battery voltages at the receiving and transmitting stations against that of a standard cell. In accordance with the present invention all adjustments necessary to obtain proper readings can be made at the receiving station without need for an attendant at the transmitting station; neither is it necessary to utilize a standard cell for adjusting both potentiometer voltages to a predetermined standard. The additional apparatus needed for effecting this consists in one form of my invention of an additional source of current or battery B2, a relay W, and a switch 8 having the stationary contact plates 9, 10, 11, 12, contact points 13, 14, 15, 16, 17 and 18, and movable contact arms 20 and 21 mechanically connected for movement in unison.

The switch 8 is in its normal or "test" position when the contact 21 is in engagement with contact point 16 and contact plate 12, as shown in Fig. 1. With the switch 8 in this position, the slide wire contact C1 of the receiving station is adjusted for balance of galvanometer G to read the height of liquid in tank 6 from the slide-wire scale 7.

From time to time, it is desirable to check the accuracy of the readings and if necessary to make adjustments. For this purpose, the contacts 20 and 21 of switch 8 are moved to the left from the position indicated. For an intermediate position of the contacts as they are moved toward the left, the contact 20 engages contact point 18 connected to one terminal of battery B2, completing a circuit to the contact plate 9, and simultaneously the contact 21 completes the circuit between the contact point 15 connected to the other terminal of battery B2 and the contact plate 11. A current flows through the transmission or link circuit conductors 1 and 2 to the winding of the polarized relay W, but the direction of current is such that the position of the armature A of the relay does not change. Upon further movement, the contact 20 connects the contact point 17 to contact sector 9, and movable contact 21 connects contact point 14 to contact sector 11, in effect reversing the connections of battery B2 to contact sectors 9 and 11. A current now flows from battery B2 through the relay W in such direction that the armature A moves to its lower position, connecting the right-hand ends of wires 1 and 2 of the link circuit J across the terminals of the slide wire S, so that the total drop of potential across the transmitter slide wire is impressed on the link circuit.

For both of these connections of the battery B2 to the link circuit, the galvanometer G is excluded so that this sensitive instrument is not subjected to the shocks of comparatively large current impulses. Specifically, the contact sector 11 is directly connected to conductor 2 by wire 2a, whereas contact sectors 10 and 12 are connected to conductor 2 through the galvanometer.

At the final or "check" position of switch 8, the movable contact 21 connects contact point 13 to contact sector 10. This connects the transmission conductors 1 and 2 to the terminals of the receiving slide wire S1. By operation of relay W for an intermediate position of the switch 8, the whole of the transmitting slide wire S is caused to be connected across one end of the transmission line or link circuit, and for the final position of the switch 8, the whole of the receiving slide wire S1 is connected across the other end of the transmission line. The total drop of potential across the transmitting potentiometer is in opposition to the total drop of potential across the slide wire of the receiving potentiometer. If these potentials are equal, as evidenced by zero deflection of the galvanometer, the readings taken when the switch 8 was in test position were correct. If the galvanometer G deflects, the resistance 22 in the receiving potentiometer circuit is adjusted until the galvanometer reading is zero and is then left in that position. The voltages impressed upon the slide wires of the two potentiometers are now equal. In a sense, the voltage of the battery B, whatever it may be, is made the standard and the voltage impressed by battery B1 on the receiver slide wire is adjusted to balance against that standard.

To restore the apparatus to service, the switch 8 is thrown to the right to its original or "test" position. The engagement between the movable contacts 20 and 21 and contact points 14 and 17 connected to the terminals of battery B2, transmits a current impulse through the relay W but in such direction that the position of armature A does not change. As the movable contacts 20 and 21 engage the points 18 and 15 connected to terminals of the auxiliary battery B2, there is transmitted a control impulse which is in proper direction to cause the armature A of the polarized relay to return to its original or upper position again connecting the slide wire contact C to the lower conductor 2 of the link circuit. The final movement of switch 8 disconnects the battery B2, and completes its circuit between the slide wire contact C1 of the receiving potentiometer and the lower link circuit conductor 2. The galvanometer G is removed from circuit when current is being transmitted from the battery B2 through the relay.

Since the total drops of potential across the slide wires are equal, it follows that for zero deflection of galvanometer G, the position of contact C1 at the receiving station will correspond to position of contact C at the transmitting station and accordingly the readings of scale 7 will be truly representative of the height of liquid in the container 6.

Although the transmitting potential is shown responsive to changes in liquid level, it is apparent that by connecting the slide wire contact C to the movable member of any measuring instrument, the system may be used to measure the particular condition to which the instrument responds. A few examples of measurement of other conditions besides liquid level are hereinafter referred to.

The source of current B2 need not be a battery or other source of direct current but may be any suitable source of alternating current. In this case, the relay winding W may be connected in series with a condenser K (Fig. 1a) across an inductance L, preferably of low resistance and substantial reactance. The unbalance current of the potentiometers being direct current is blocked by condenser K and does not energize the winding; however, in moving the test-check switch from one position to the other an impulse of alternating current flows over the link circuit and energizes the relay to change the connections of the transmitter as previously described. With this modification, one of the pairs of contacts 14, 17, 15, 18 may be omitted and the relay is of a known type having the characteristic that successive energizations effect movement of the armature alternately in opposite directions.

For continuous recording of the measured condition, there may be utilized recording apparatus generally similar to that of Leeds' Patent No. 1,125,699, in which the receiver slide wire S1 is carried by a disk 23 on the recorder shaft 24. Briefly, as the needle or pointer 25 of galvanometer G deflects in one direction or the other, the shaft 24 is rotated in one direction or the other, and to an extent corresponding to the extent of the galvanometer deflection. For example, when the needle 25 deflects to the right, due to periodic vertical movement of member 26 by cam 27, the needle is clamped between the inclined edge 28, and lower edge 29 of the right-hand member 30, causing the latter to be tilted in a clockwise direction about its pivot 31, thereby pushing the right-hand pin 32 and so tilting the movable arm 33 in a clockwise direction, while cam 34 is holding the clutch shoes 35 from the rim of the clutch wheel 36. The cam 34 which is rotated at constant speed by a motor M or other suitable source of power, soon thereafter allows the shoes to again grip the clutch wheel and soon thereafter the left-hand cam 37 engages the ear 38 which has been elevated, pushing it downward, due to rotation of shaft 39 by motor M, to restore it to the horizontal position indicated, but in so moving back to normal position, the clutch member rotates the disk 36 and shaft 24 affixed thereto in counter-clockwise direction. By this movement the potentiometer slide wire S1 is adjusted until the galvanometer deflection is zero.

Secured upon the shaft 24 is the grooved pulley wheel 40 around which is wrapped the cord 41 which passes over the idler rollers 42 and has attached thereto the pen, stylus or marker 43 for drawing or impressing upon the record sheet or paper 44, a mark or record of the changes in liquid level or other measured condition. The paper 44 is driven by the motor M. By using the recorder shown in Fig. 2, the potentiometer network automatically and continuously balances itself, and in so doing produces a continuous record of the conditions at the transmitting station. It is only necessary for an attendant from time to time to throw the switch 8 from test to check position to re-adjust the resistance 22 until the galvanometer G balances. The switch 8 is then thrown back to its original or test position and the apparatus is again in condition for operating without further attention. If desired, the recalibration of the receiver potentiometer may be automatically effected as in the aforesaid Leeds patent so that the operations of measuring, checking, and readjustment are automatically performed. In view of the small current required for the operation of the potentiometer, the renewal of battery B, requiring an attendant to go to the transmitting station, is necessary only after long periods of use. Since the voltage of battery B is determinable at the receiving station, inspections of the battery B, by more or less frequent visits to the transmitting station, are not necessary, as heretofore.

The system shown in Fig. 3 is generally the same as that of Fig. 1; the batteries at the receiving and transmitting stations of Fig. 1 are replaced by the transformers t and t1, respectively. The galvanometer G, Fig. 3, is of the alternating current type, having its field f excited from the alternating current line L which feeds transformer t1. At the receiving end of this system, the movable slide wire contact C is disclosed as mechanically connected to the movable element of a watt-meter 45 for measuring the current delivered to or from a translating device 46, for example, a motor or an alternator. The line L1 to which the translating device 46 is connected, may be the same as line L associated with the receiving station, or it may be a different line provided the phase relations are correct. Even when the lines L1 and L are the same, the voltage impressed on the primary of transformer t may be different from that impressed upon primary of the transformer t1, or more generally, the voltage impressed across the terminals of the slide wires at the receiving and transmitting stations may differ, and to such extent that the accuracy of the readings of scale 7 is seriously impaired. As in Fig. 1, without need for an attendant at the distant transmitting station, the system may be adjusted to insure accurate readings by adjusting the voltage of the current source for the receiver potentiometer to balance the voltage of the transmitter potentiometer. As in the system already described, the switch 8 may be thrown from "test" to "check" position and the resistance 22 adjusted until the galvanometer gives zero deflection, indicating that the voltages impressed across the potentiometer slide wires by their respective supply sources, are equal. The switch 8 is then thrown back to its "test" position with the assurance that the readings obtained from scale 7 are correct. While the alternating current system shown has been described as specifically for measuring electric power, it can be used equally well for measuring any other condition, by suitably connecting the slide wire contact C of the transmitting potentiometer to the movable element of the proper instrument for measuring the desired condition.

In Figs. 4 and 5 is shown a simple and preferred type of check-test switch 8. The movable contacts 20 and 21 are simultaneously rotatable by a knob 47 through which screw 48 passes to clamp the knob and the movable contacts to shaft 49. Preferably and as indicated, the movable contacts are insulated from each other. The lower end of the outer contact 20, as shown most clearly in Fig. 4 is continuously in engagement with the circular contact 9. The corresponding end of contact 21 successively engages the contacts 10, 11 and 12 which are separate sectors having the same radius. The contacts 13, 14, 15 and 16 lie outside of contact ring 9 in the path of movement of the upper end of the movable contact 21. The contacts 17 and 18 are respectively in radial alignment with contacts 14 and 15, at a somewhat greater distance from the axis of rotation of the movable contacts, and in the path of movement of the upper end of the movable contact 20. The stops 50 and 51 define respectively the "test" and "check" positions of switch 8.

In the modification shown in Fig. 6 the conduit 57 may be a steam header from a boiler or battery of boilers and the variations in pressure due to load variations cause the piston 56 to move to different positions. The resulting movement of the slide wire contact C disturbs the balance of the potentiometers, and the slide wire contact C1 at the receiving station is moved either manually or by the recording mechanism described to re-establish the balance and indicate the new value of pressure or flow. The demand upon the steam generating system at the transmitting station can be continuously and accurately determined at the more or less remote receiving station.

A further modification of my invention is disclosed in Fig. 7. In this system, the relay W1 is of a well known type in which successive current impulses of like polarity effect movements of the armature A1 alternately in opposite directions.

Assuming the armature A1 to be in the position shown, the apparatus is in condition for indicating at the receiving station the magnitude of the condition measured at the transmitting station. To check the voltage applied to the transmitting slide wire S, the switch 58 is momentarily closed to transmit a current impulse to the relay W1 which effects movement of armature A1 to its upper position, connecting the link circuit conductor 1 to the upper terminal of the slide wire S. Preferably simultaneously with actuation of switch 58, the galvanometer G is short circuited by switch 59.

The slide wire contact C1 is then moved to its upper extreme position, or as in the previous modification a switch may be used to connect the other end of the link conductor 1 to the upper end of the receiving slide wire S1. The resistance 22 is then adjusted until there is no deflection of galvanometer G compensating for difference between the voltages of batteries B1 and B. To restore the system to "test" condition, the switch 58 is again momentarily depressed which by energization of relay W1 causes armature A1 to move to its lower position connecting the slide wire contact C to the link circuit conductor 1. This system also does not require an attendant at the transmitting station to adjust the potentiometer current by comparing the voltage of battery B with that of a standard cell, as was the usual practice. This system as well as the systems of Figs. 1 and 3 has the economic advantage of requiring only two conductors between the transmitting and receiving stations.

The slide wire contact C at the transmitting end may be connected to a movable element of any measuring device, for example, to the movable structure of a voltmeter V connected across the line L2.

A further modification of my invention is shown in Fig. 8. In this system, the transmitting potentiometer does not include a slide wire and adjustable contact. The coil S2 is a thermometer coil of the usual type and is made of a suitable wire whose resistance varies more or less substantially with temperature. Accordingly the potential drop across the coil varies for the different temperatures, and the coil is therefore the equivalent of the varying portion of slide wire S, Fig. 1, between contact C and the upper slide wire terminal. Normally the armature A of the relay W is in its lower position so that the link circuit conductors 1 and 2 are connected to the terminals of the coil S2. As in the preceding modifications, the slide wire contact C1 at the receiving end is manually or otherwise adjusted until there is zero deflection of the galvanometer. The scale 7 is then read in the units of measurement of the condition under measurement, for example, in the system of Fig. 8, the scale 7 would be calibrated in degrees. To adjust the system from time to time to maintain accuracy of the readings, current impulses are transmitted to the relay W, as in any of the modifications described, to cause the armature A to move to its upper position, connecting the link circuit conductor 1 to the upper terminal of the resistance S3 which is connected in series with the thermometer coil S2 across the terminals of battery B, or preferably as indicated to one terminal of the battery and a terminal of a suitably high resistance r, whose other terminal is connected to the opposite pole of the battery B.

As in the preceding modifications the potentiometer current of the receiving station is adjusted to obtain zero deflection of the galvanometer. Another current impulse is then transmitted over the link circuit to energize relay W to return the armature A to its lower position.

A more elaborate system for obtaining a series of readings at the receiving station of a plurality of conditions at the transmitting station, is shown in Fig. 9. For example, a plurality of thermometer coils S2, S4, S6, etc., are connected in series with a resistance r and the battery B.

The right-hand ends of the link circuit conductors 1 and 2 are connected respectively to the movable contact arms 61 and 61a of dial switches 60 and 60a which successively engage fixed contact points to connect resistance R, coils S2, S4, S6 etc., in turn across the transmitter end of the link circuit.

At the receiving station a motor M, for example the motor of the recorder mechanism of Fig. 2, drives a cam 63 periodically to move the contact 64 into engagement with a fixed contact 65, completing a circuit from the battery B2 through the coil 66 of the magnetic step-by-step mechanism 67 and the coil 68 of the magnetic step-by-step mechanism 69 for driving the movable contacts 61 and 61a of the dial switches 60 and 60a. At suitable intervals, for example, one minute, the step-by-step mechanisms are simultaneously energized to move the contact 61 and 61a of the dial switches at the transmitting station from one position to another to change from one temperature coil to another, and correspondingly at the receiving end the contact pointer 70 is moved from one indicating position to another. For this modification of my invention, a multiple point recorder, such as that shown in the aforesaid Leeds' patent, may be used, to give characteristically different impressions or records as the receiving potentiometer is connected to the different thermometer coils, or equivalent, and the stepping of the marker disk is synchronized with the step-by-step movement of the switches 61 and 70.

During the comparatively long intervals between the short impulses moving the contacts 61 and 70 from one position to another, the switch member 64 is in its lower position in engagement with the fixed contact 71. This is the normal operating or "test" condition and as in the preceding circuits the connections are such that the link circuit conductors at the receiving end are connected to one terminal of the slide wire and to the slide wire contact, and at the transmitting end the link circuit conductors are connected across the temperature coils, or more broadly, the variable portion of a potentiometer resistance.

When the movable contacts 61 and 61a have been stepped around so that they engage contacts 62 and 62a, the movable contact 70 at the transmitting station is simultaneously connected to the contact 72 connected to the lower terminal of slide wire S1. If the voltage drop across the receiving potentiometer slide wire does not correspond to the voltage drop across resistance r, the galvanometer G deflects. As in the previous modifications, the two potentiometer circuits are balanced by adjusting the resistance 22 at the receiving station until there is no deflection of galvanometer G. This adjustment can be readily and rapidly obtained so that the time interval afforded by periodic operation of the switch 64 is sufficient. This adjustment can be made manually, or can be effected automatically by the recorder mechanism itself, in a manner similar to that disclosed in the aforesaid Leeds patent in which the recorder mechanism periodically recalibrates its own network.

In this modification, the receiver is not only recalibrated to compensate for change in the transmitter current (if any) source but also for the change in current through the temperature coils due to their change of resistance with temperature.

Preferably, and as indicated, a switch 73 moved in unison with the movable contact 64, shunts the galvanometer during transmission of the stepping impulses. This avoids damage to the sensitive instrument by passage of currents many times heavier than the unbalance current of the two potentiometers.

Insofar as the telemetric measuring is concerned, the length or resistance of the conductors 1 and 2 comprising the link circuit, is of little importance, since the current traversing them is always low and is of zero value when the potentiometers are balanced. The battery B2 in the several modifications should be of sufficiently high voltage to insure energization of the relays W or equivalent. The voltage of battery B2 must be higher than that of battery B1 to obtain reversal of current through polarized relay W since for one of the intermediate positions of switch 8 the batteries are in opposition.

While I have illustrated several modifications of my invention, it is apparent that further changes can be made without departing from the spirit and scope of my invention as expressed by the appended claims.

What I claim is:

1. A telemetric system comprising potentiometers disposed respectively at receiving and transmitting stations, separate sources of current supply therefor, a link circuit for connecting said stations, switching means at said receiving station for selectively connecting one end of said link circuit to the receiving potentiometer or the current supply therefor, relay means at said transmitting station controlled by said switching means selectively to connect the other end of said link circuit to the transmitting potentiometer or to the current supply therefor, and means for adjusting the voltage of the current supply for the receiving potentiometer to balance the voltages of said sources when connected to opposite ends of said link circuit.

2. A telemetric system comprising potentiometers disposed respectively at receiving and transmitting stations, separate sources of current supply therefor, a two-wire link circuit for connecting said stations, switching means at said receiving station for selectively connecting the opposite ends of said link circuit to said potentiometers or to said sources of current supply therefor, and means for adjusting the voltage of the current supply for the receiving potentiometer to balance the voltages of said sources when connected to said opposite ends of said link circuit.

3. A telemetric system comprising potentiometers disposed respectively at receiving and transmitting stations, separate sources of current supply therefor, a link circuit for connecting said stations, switch structure at said receiving station movable to one position for connecting one end of said link circuit to the variable portion of said receiver potentiometer and to another position for connecting said end of said link circuit to the current supply for said receiver potentiometer, relay mechanism at said transmitting station energized for another position of said switch structure correspondingly to change the connections of the other end of said link circuit, and means for varying the effective voltage of said current supply for said receiver potentiometer.

4. A telemetric system comprising potentiometers disposed respectively at receiving and transmitting stations, separate sources of current supply therefor, a link circuit for connecting said stations, switch structure at said receiving station movable to one position for connecting one end of said link circuit to the variable portion of said receiver potentiometer and to another position for connecting said end of said link circuit to the current supply for said receiving potentiometer, a source of control current, relay mechanism at said transmitting station energized by current from said control current source for an intermediate position of said switch structure correspondingly to change the connections of the other end of said link circuit, and means for varying the effective voltage of said current supply for said receiver potentiometer.

5. A telemetric system comprising potentiometers disposed respectively at receiving and transmitting stations, separate sources of current supply therefor, a link circuit for connecting said stations, a deflecting instrument at said receiving station responsive to current in said link circuit, switch structure at said receiving station movable to one position for connecting one end of said link circuit to the variable portion of said receiver potentiometer and to another position for connecting said end of said link circuit to the current supply for said receiver potentiometer, a source of control current, relay mechanism at said transmitting station energized by current from said control current source for an intermediate position of said switch structure correspondingly to change the connections of the other end of said link circuit, means for varying the effective voltage of said current supply for said receiver potentiometer, and means preventing substantial flow of current through said instrument for said intermediate position of said switch.

6. A telemetric system comprising potentiometers disposed respectively at receiving and transmitting stations, separate sources of current supply therefor, a link circuit connecting said stations, a polarized relay at said transmitting station included in said link circuit, a source of control current, and switching mechanism movable from one position to another position for changing the connections at one end of said link circuit from the variable portion of said receiver potentiometer to said current supply therefor through an intermediate position effecting flow of current from said source of control current through said link circuit and in proper direction correspondingly to change the connections at the other end of said link circuit.

7. A telemetric system comprising potentiometers disposed respectively at receiving and transmitting stations, separate sources of current supply therefor, a two-conductor circuit connecting said stations switching structure at said receiving station operable selectively to connect said potentiometers to each other or said sources of supply to each other, and means for adjusting the effective voltage of said source of supply for said receiver potentiometer to balance the voltage of said source of supply for said transmitter potentiometer.

8. A telemetric system comprising potentiometers disposed respectively at receiving and transmitting stations, separate sources of current supply therefor, a pair of conductors extending between said stations and normally connecting the potentiometers, means operable at said receiving station to send a control current through said conductors, and means at said transmitting station responsive to said control current for connecting said conductors to said current supply for said transmitter potentiometer.

9. A telemetric system comprising potentiomertes disposed respectively at receiving and transmitting stations, separate sources of current supply therefor, a pair of conductors extending between said stations, means for intermittently changing the connections of said conductors from said transmitter potentiometer to said source of current therefor, and means at said receiving station for adjusting the effective voltage of said source of current for said receiver potentiometer to balance the voltages of said sources.

10. A telemetric system comprising potentiometers disposed respectively at receiving and transmitting stations. separate sources of current supply therefor, a pair of conductors extending between said stations, means for intermittently changing the connections of said conductors from said transmitter potentiometer to said source of current therefor and substantially simultaneously changing the connection from the other ends of said conductors from said receiver potentiometer to said source of current therefor, and means at said receiving station for balancing the effective voltages of said sources of supply as impressed on said conductors.

11. A telemetric system comprising a plurality of transmitter potentiometers, a source of current therefor, a link circuit comprising a pair of conductors, switching mechanism for successively connecting said potentiometers and said source of current to said conductors, a receiver potentiometer, a source of current therefor, switching mechanism for connecting said conductors alternately to said potentiometer and said source of current therefor, and means for transmitting a control current in a circuit including said conductors to effect movement of said switching mechanisms in synchronism.

12. A telemetric system comprising a plurality of transmitter potentiometers, a source of current therefor, a link circuit comprising a pair of conductors, switching mechanism for successively connecting said potentiometers and said source of current to said conductors, a receiver potentiometer, a source of current therefor, switching mechanism for connecting said conductors alternately to said potentiometer and said source of current therefor, means for transmitting a control current in a circuit including said conductors to effect movement of said switching mechanisms in synchronism, and means operated when said sources of current are connected to opposite ends of said link circuit to balance the effective voltages thereof.

13. A telemetric system comprising potentiometers disposed respectively at receiving and transmitting stations, separate sources of current supply therefor, a link circuit connecting said stations, switch means at said receiving station for connecting one end of said link circuit to the variable portion of said receiver potentiometer or to a fixed portion of said potentiometer, relay mechanism at said transmitting station correspondingly to change the connections at the other end of said link circuit, and means for varying the effective voltage of said current supply for said receiver potentiometer.

14. A telemetric system comprising potentiometers disposed respectively at receiving and transmitting stations, separate sources of current supply therefor, a link circuit for connecting said stations, switch structure at said receiving station for connecting one end of said link circuit to the variable portion of said receiver potentiometer or to a fixed portion thereof, a source of control current, relay mechanism at said transmitting station energized from said source of control current upon change in the connection of the link circuit at its receiving end to effect like changes at the transmitting end thereof, and means for varying the effective voltage of said current supply for said receiver potentiometer.

15. A telemetric system comprising potentiometer networks disposed respectively at receiving and transmitting stations, separate sources of current supply therefor, a two-wire link circuit for connecting said stations, a relay at said transmitting station, switching means at said receiving station for connecting the receiving end of said link circuit to the variable portion of the receiving potentiometer or to a fixed portion thereof and for controlling said relay to effect like change in connections of the link circuit at its transmitting end, and means for adjusting the current supply of the receiving potentiometer to effect balance of the voltages of said fixed portions of said potentiometers when connected to opposite ends of said link circuit.

FELIX WUNSCH.